(12) United States Patent
Kitai et al.

(10) Patent No.: US 6,601,668 B2
(45) Date of Patent: Aug. 5, 2003

(54) METHOD OF CONTROLLING SELECTIVE FOUR-WHEEL DRIVE TRANSMISSION SYSTEM FOR ALL-TERRAIN VEHICLE

(75) Inventors: Haruo Kitai, Akashi (JP); Yoshikazu Sakakihara, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/085,407

(22) Filed: Mar. 1, 2002

(65) Prior Publication Data

US 2002/0125057 A1 Sep. 12, 2002

(30) Foreign Application Priority Data

Mar. 7, 2001 (JP) ........................................ 2001-063289

(51) Int. Cl.[7] ............................................. B60K 17/344
(52) U.S. Cl. .................... 180/233; 192/69.71; 192/84.6
(58) Field of Search ................................ 180/247, 233; 475/199; 192/69.71, 69.82, 84.6, 30 W; 74/730.1

(56) References Cited

U.S. PATENT DOCUMENTS

| | | | | |
|---|---|---|---|---|
| 5,699,871 A | * | 12/1997 | Hara et al. .................. | 180/247 |
| 5,802,489 A | * | 9/1998 | Orbach et al. ................. | 701/50 |
| 6,125,961 A | * | 10/2000 | Matsufuji .................... | 180/233 |
| 6,381,530 B1 | * | 4/2002 | Vogt ............................. | 701/69 |
| 6,484,607 B2 | * | 11/2002 | Shichinohe et al. ........ | 74/730.1 |
| 6,491,126 B1 | * | 12/2002 | Robinson et al. ........... | 180/233 |

* cited by examiner

Primary Examiner—Lesley D. Morris
Assistant Examiner—Tony Winner
(74) Attorney, Agent, or Firm—Oliff & Berridge, PLC

(57) ABSTRACT

A selective four-wheel drive transmission system includes a dog clutch (48) to be engaged and to be disengaged to set the selective four-wheel drive transmission system for a four-wheel drive mode and a two-wheel drive mode, respectively. The dog clutch (48) has a moving sleeve (52) provided with projections (51), and a coupling member (50) provided with recesses (57). An electric motor (53) internally provided with a potentiometer (54) shifts the moving sleeve (52) between a disengaging position ($A_0$) and an engaging position ($A_2$) to engage and disengage the dog clutch (48). A controller controls the electric motor (53) on the basis of a signal provided by the potentiometer (54) and indicating the position of the moving sleeve (52) to move the moving sleeve (52). If the projections (51) are unable to engage in the recesses (57) for a time exceeding a predetermined time, the moving sleeve (52) is returned to the disengaging position ($A_0$), and, after the passage of a predetermined time, the moving sleeve (52) is moved again toward the engaging position ($A_2$).

4 Claims, 9 Drawing Sheets

METHOD OF CONTROLLING SELECTIVE FOUR-WHEEL DRIVE TRANSMISSION SYSTEM FOR ALL-TERRAIN VEHICLE

BACKGROUND OF THE INVENTION

1. Field of the Invention

The present invention relates to a method of selectively setting a selective four-wheel drive transmission system for an all-terrain vehicle, including a front power transmission line, a rear power transmission line, and a dog clutch included in either the front or the rear power transmission line for a two-wheel drive mode or a four-wheel drive mode by controlling the dog clutch.

2. Description of the Related Art

Most conventional all-terrain vehicles are provided with a full-time four-wheel drive transmission system, and some conventional all-terrain vehicles are provided with a selective four-wheel drive a part-time four-wheel drive transmission system. Generally, the selective four-wheel drive transmission system has a front reduction gear for driving front wheels, provided with a dog clutch, and the dog clutch is operated by manual operation or by an electric actuator, such as an electric motor.

An electric dog clutch has a moving member provided with teeth, and a stationary member provided with teeth. The moving member is moved axially between an engaging position where the teeth of the moving and the stationary member are engaged and a disengaging position where the teeth of the moving and the stationary member are disengaged by an electric actuator to select either the two-wheel drive mode or the four-wheel drive mode. Manual control of a dog clutch requires heavy work. Electric control of an electric dog clutch using an electric actuator for shifting the moving member only controls the electric actuator, such as an electric motor, which involves the following problems.

(1) When changing the selective four-wheel drive transmission system from the two-wheel drive mode to the four-wheel drive mode by engaging the dog clutch, the moving member is shifted from the disengaging position to the engaging position. Sometimes, the teeth of the moving and the stationary member interfere with each other and the selective four-wheel drive transmission system cannot be smoothly changed from the two-wheel drive mode to the four-wheel drive mode.

(2) In a state where the dog clutch is engaged and the selective four-wheel drive transmission system is set for the four-wheel drive mode, sometimes, the moving member is forced away from the stationary member. If the selective four-wheel drive transmission system is operated in the four-wheel drive mode with the teeth of the dog clutch engaged incompletely, the teeth are liable to be abraded quickly or irregularly because the effective torque transmitting area of the teeth is reduced.

SUMMARY OF THE INVENTION

Accordingly, it is an object of the present invention to provide a method of controlling a selective four-wheel drive transmission system provided with a dog clutch for an all-terrain vehicle, capable of smoothly changing the selective four-wheel drive transmission from a two-wheel drive mode to a four-wheel drive mode and of constantly maintaining the dog clutch in a normally engaged state in the four-wheel drive mode.

According to the present invention, a method of controlling a selective four-wheel drive transmission system for an all-terrain vehicle, said selective four-wheel drive transmission system including a front transmission system for transmitting driving power to front wheels, a rear transmission system for transmitting driving power to rear wheels, a dog clutch including a stationary member provided with teeth and a moving member provided with teeth, and included in either the front transmission system or the rear transmission system so as to be engaged or disengaged to set the selective four-wheel drive transmission system selectively for a four-wheel drive mode or a two-wheel drive mode, an electric actuator for moving the moving member of the dog clutch between an engaging position and a disengaging position, a position sensor incorporated into the electric actuator and capable of determining a position where the moving member is situated, and a controller for controlling the electric actuator, comprises the steps of: determining a position of the moving member of the dog clutch by the position sensor; sending a position signal representing the position of the moving member of the dog clutch and provided by the position sensor to the controller; and controlling the position of the moving member of the dog clutch on the basis of the position signal by the controller.

Thus, the moving member of the dog clutch can be held correctly at the engaging position or the disengaging position, the selective four-wheel drive transmission system can be set properly for the four-wheel drive mode or the two-wheel drive mode, and torque can be properly transmitted.

It is preferable that, the electric actuator is controlled such that the moving member of the dog clutch is returned temporarily to the disengaging position and is moved again toward the engaging position when the dog clutch cannot be properly engaged when changing the selective four-wheel drive transmission system from the two-wheel drive mode to the four-wheel drive mode.

Thus, it is possible to change smoothly the selective four wheel drive transmission from the two wheel drive mode to the four wheeled mode.

It is preferable that, the electric actuator is controlled so as to force the moving member of the dog clutch to the engaging position when a position sensor detects movement of the moving member toward the disengaging position by a distance exceeding a predetermined distance in a state where the selective four-wheel drive transmission system is set for the four-wheel drive mode.

Thus, it is possible to reduce the possibility of the rapid abrasion of the teeth of the dog clutch due to reduction in the area of the torque transmitting surface of the teeth of the dog clutch.

It is preferable that, the electric actuator is controlled by a duty factor control system, and the duty factor of power supplied to the electric actuator during movement of the moving member of the dog clutch from a start position to a contact position is smaller than that of power supplied during movement of the moving member of the dog clutch from the contact position to a engaging position.

Thus, shocks on the dog clutch when the teeth of the moving and the stationary member strike against each other can be reduced, and the drive mode can be smoothly changed because the electric actuator is operated at a high duty factor after the teeth of the moving member and stationary member are engaged.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
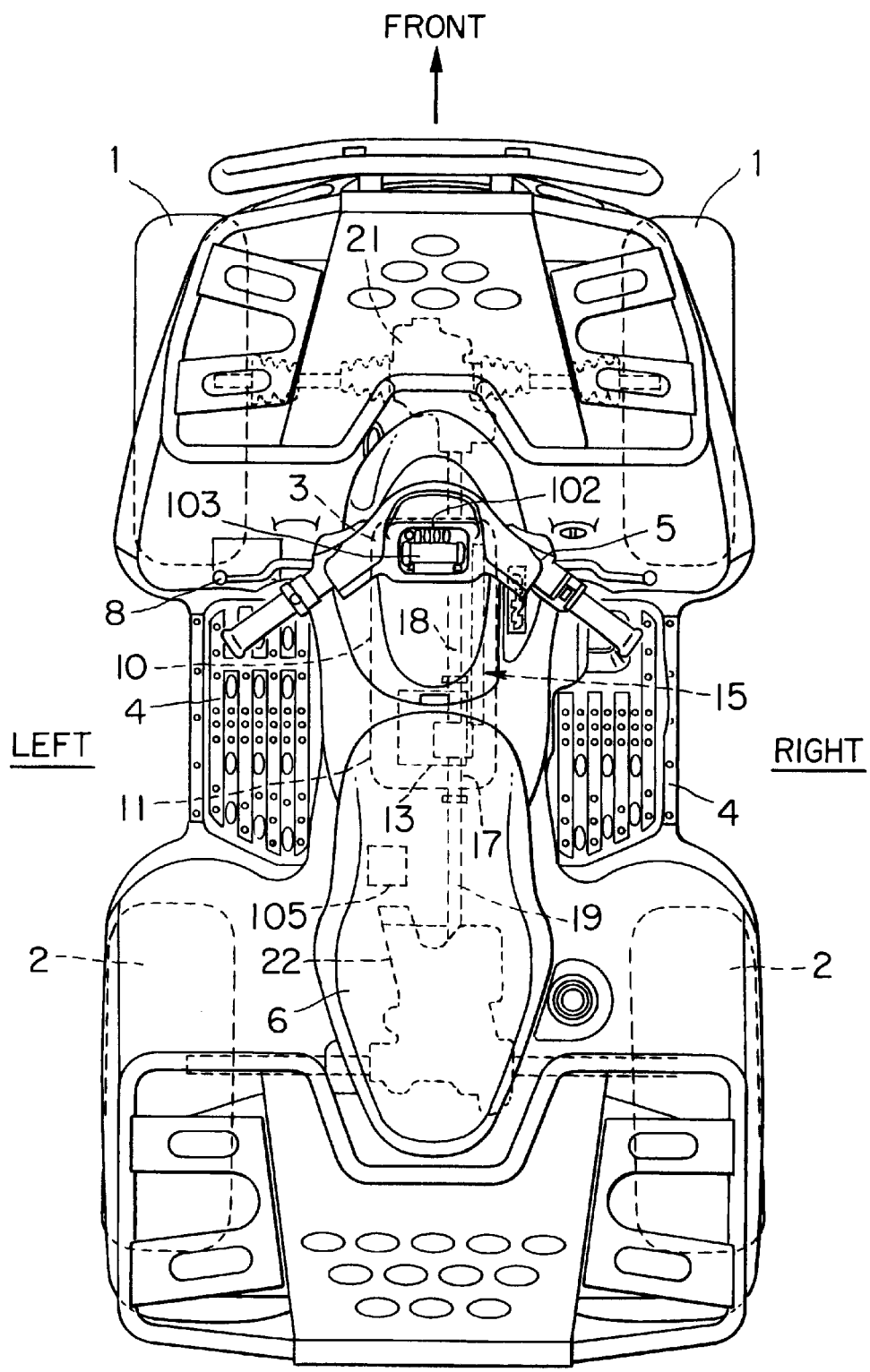
FIG. 1 is a plan view of a straddle-type four-wheeled all-terrain vehicle to which the present invention is applied.

Referring to FIG. 1, a straddle-type four-wheeled all-terrain vehicle, to which the present invention is applied, has right and left front wheels 1 suspended from a front part of a body frame, right and left rear wheels 2 suspended from a rear part of the body frame, an engine 3 mounted on a middle part between the front wheels 1 and the rear wheels 2 of the body frame, and right and left steps 4 disposed on the opposite sides of the engine 3. A handlebar 5 is supported on an upper part of the body frame, and a straddle-type seat 6 is disposed behind the handlebar 5. An instrument panel is held on a middle part of the handlebar 5 and instruments including a speed meter 103, and pilot lamps including a two-wheel drive mode indicating lamp, a four-wheel drive mode indicating lamp and an oil pressure warning lamp are arranged on the instrument panel.

A crankcase 10 included in the engine 3 extends rearward, and a transmission case 11 is joined to the rear end of the crankcase 10. A gear transmission mechanism 13 is built in the transmission case 11. A variable-speed V-belt drive 15 is disposed on the right side of the crankcase 10. The output power of the engine 3 is transmitted through the variable-speed V-belt drive 15 to the gear transmission mechanism 13.

A longitudinal drive shaft 17 is extended under the transmission case 11. The drive shaft 17 has a front end connected to a front propeller shaft 18 for driving the front wheels, and a rear end connected to a rear propeller shaft 19 for driving the rear wheels 2. The front propeller shaft 18 has a front end part interlocked with a front reduction gear built in a front reduction gear case 21. The rear propeller shaft 19 has a rear end part interlocked with a rear reduction gear built in a rear reduction gear case 22.

Figure 2:
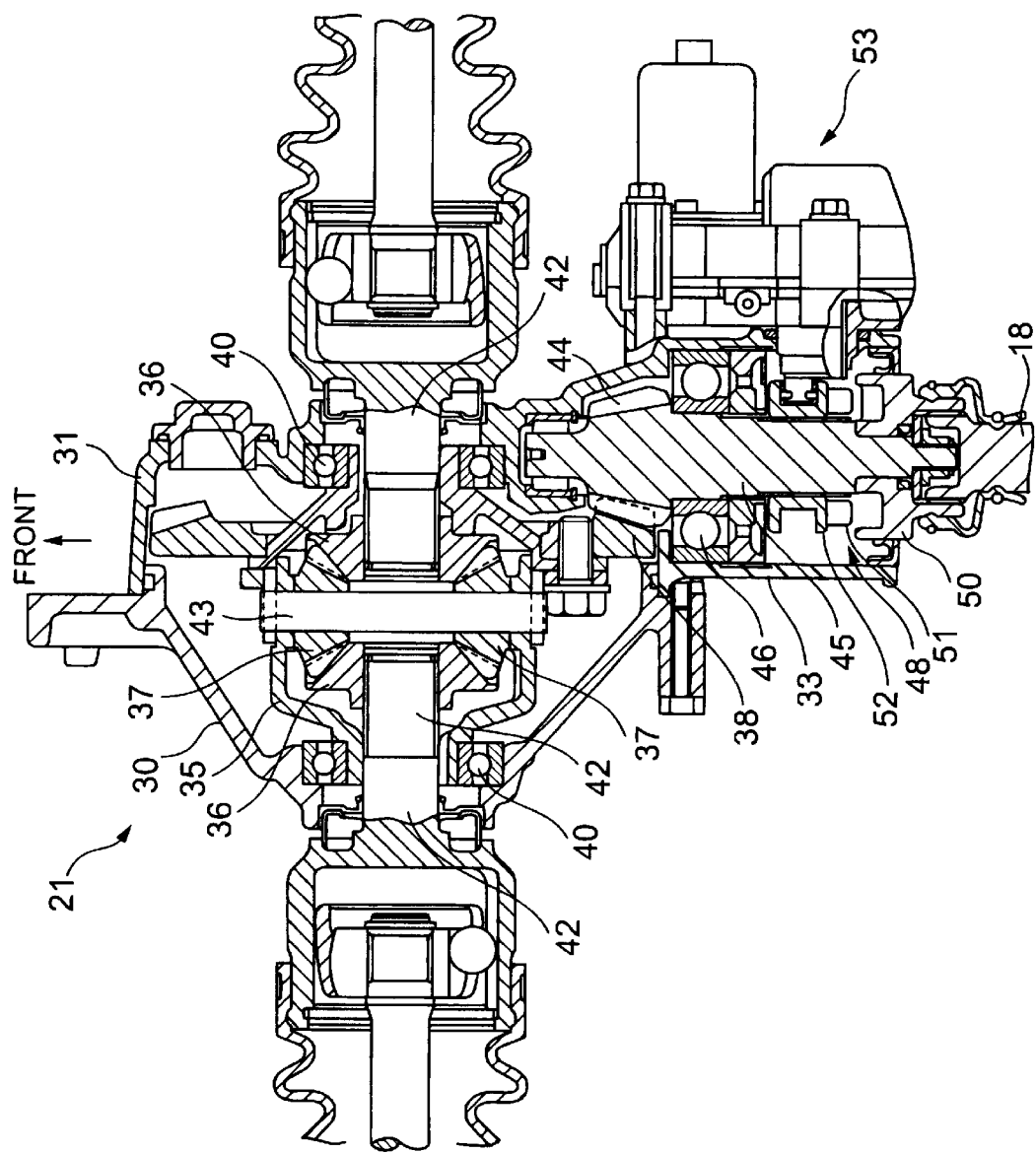
FIG. 2 is an enlarged, longitudinal sectional view of a front reduction gear.

Referring to FIG. 2 showing the front reduction gear built in the front reduction gear case 21 in a longitudinal sectional view, the gear case 21 has a case body 30 and a case cover 31 joined to the case body 30. A cylindrical input gear case 33 is formed integrally with the case cover 31 so as to extend rearward from the case cover 31. The front reduction gear case 21 including the input gear case 33 is filled with lubricating oil. A differential gear mechanism is built in the front reduction gear case 21. The differential gear mechanism includes a differential case 35, right and left side gears (bevel gears) 36, a pair of pinions (bevel pinions) 37 engaged with the side gears 36, and a crown shaped-large reduction gear 38. The differential case 35 is supported for rotation in bearings 40 in the front reduction gear case 21. The side gears 36 are fixedly mounted on inner end parts of right and left front drive shafts 42, respectively. The pinions 37 are supported for rotation on a support shaft 43 held on the differential case 35 and are engaged with the side gears 36. The large reduction gear 38 is fixedly joined to the outer surface of the differential case 35 and is engaged with an input pinion 44. A front input shaft 45 formed integrally with the input pinion 44 is supported in a bearing 46 on the input gear case 33. The input shaft 46 can be connected to and disconnected from the front propeller shaft 18 by a drive mode selecting dog clutch 48 for selecting a two-wheel drive mode or a four-wheel drive mode.

Figure 3:
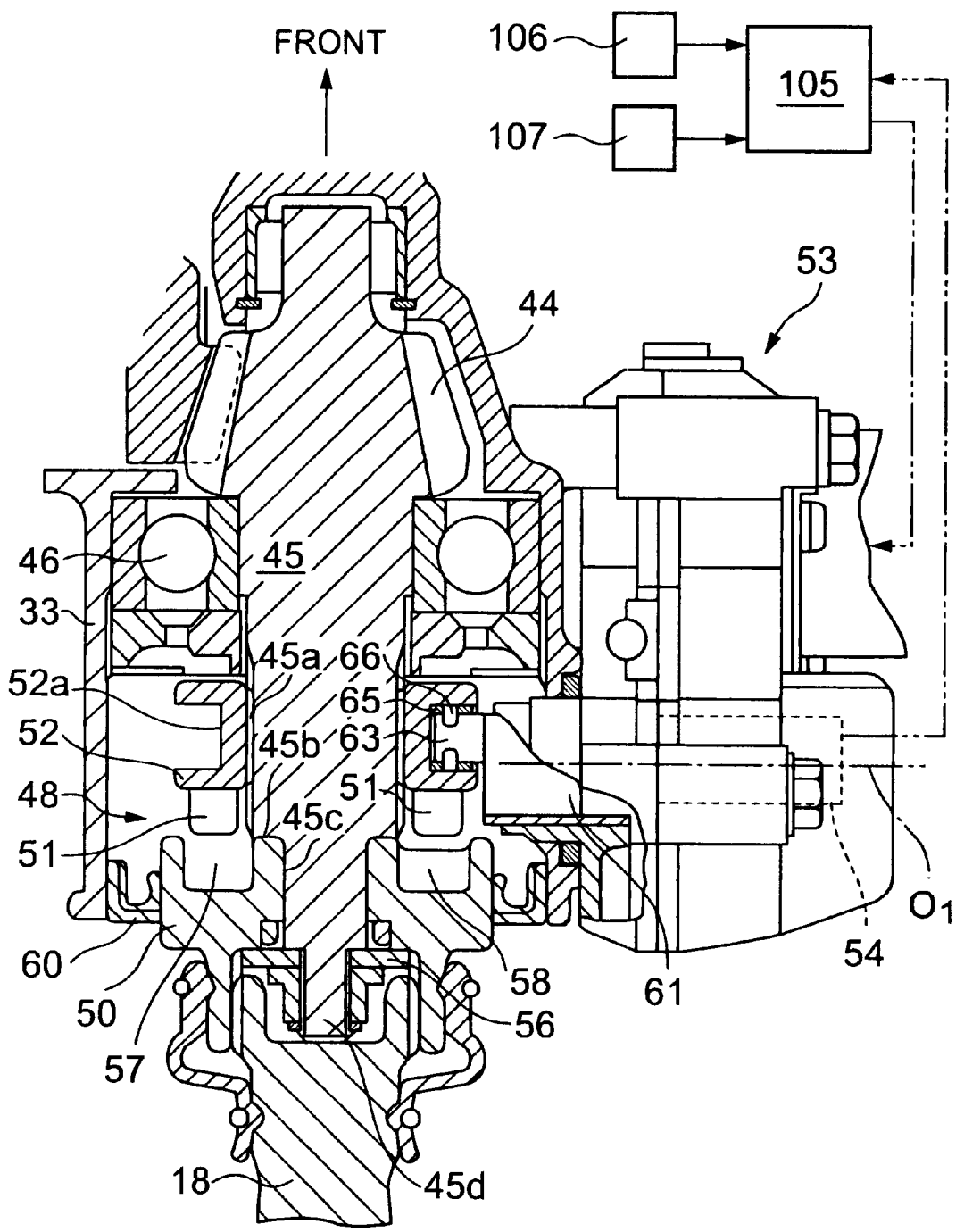
FIG. 3 is an enlarged, longitudinal sectional view of a two-wheel/four-wheel drive mode selecting device.
Figure 6:
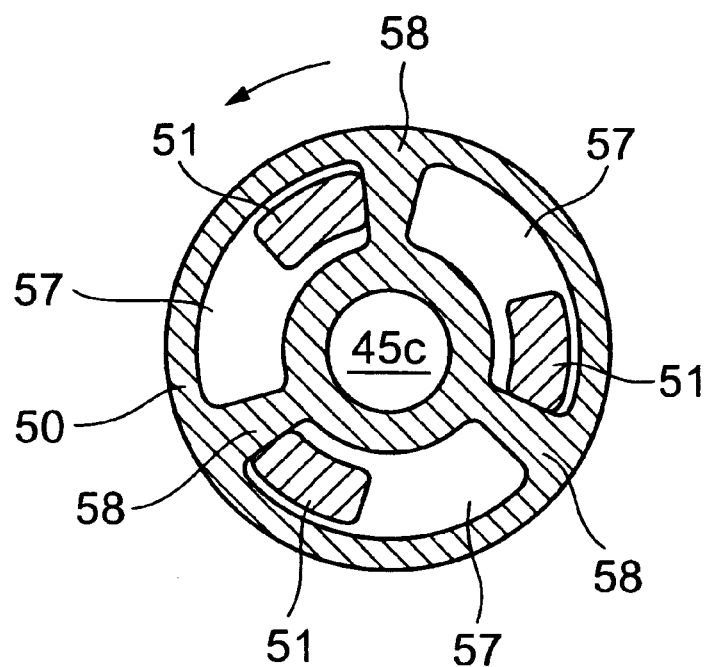
FIG. 6 is a sectional view taken on line VI—VI in FIG. 5.

Referring to FIG. 3 showing the drive mode selecting dog clutch 48 in an enlarged sectional view, the drive mode selecting dog clutch 48 includes a coupling member (stationary member) 50 connected to the front propeller shaft 18 by splines, a moving sleeve (moving member) 52 provided with three projections 51, and an electric motor 53 internally provided with a potentiometer 54, i.e., a position sensor. The input shaft 45 extends longitudinally. Splines 45a are formed in a middle part of the input shaft 45. The input shaft 45 has a shoulder 45b formed behind the splines 45a, a reduced part 45c extending rearward from the shoulder 45b, and an externally threaded part 45d extending rearward from the reduced part 45c. The coupling member 50 is put on the reduced part 45c for rotation on the same. The coupling member 50 is restrained from axial movement by the shoulder 45b and a stop ring 56 screwed on the externally threaded part 45d. A rear part of the coupling member 50 is splined to the front propeller shaft 18, so that the coupling member 50 rotates together with the front propeller shaft 18. Recesses 57 are formed in the front surface of the coupling member 50. As shown in FIG. 6, three radial ribs 58 arranged at equal angular intervals demarcate the recesses 57. An oil seal 60 is fitted in the rear open end of the input gear case 33 to seal a gap between the coupling member 50 and the input gear case 33.

The moving sleeve 52 is interlocked with the input shaft 45 by the splines 45a. Thus, the moving sleeve 52 is restrained from rotation relative to the input shaft 45 and is allowed to move axially relative to the input shaft 45. The moving sleeve 52 is provided in its outer circumference with an annular groove 52a of a U-shaped cross section. The three projections 51 are formed on the rear end surface of the moving sleeve 52 at equal angular intervals so as to face the recesses 57 of the coupling member 50.

The electric motor 53 is fixedly connected to the input gear case 33 with its output shaft 61 extended into the input gear case 33 perpendicularly to the front input shaft 45. A shifting pin 63 is attached to the end surface of the output shaft 61. The shifting pin 63 is eccentric to the axis $O_1$ of the output shaft 61. The shifting pin 63 is able to rotate about its axis on the output shaft 61. A collar 65 substantially resembling a rectangular solid is mounted on the shifting pin 63 and is held in place by a pin 66 pressed in holes formed through the collar 65 and the shifting pin 63.

Power supplied to the electric motor 53 is controlled in a duty factor control mode to control the output torque of the electric motor 53. The potentiometer 54 incorporated into the electric motor 53 determines the angular position and the angle of rotation of the output shaft 61 through the detection of a change in voltage, and gives electric signals representing the angular position and the angle of rotation to a controller 105. A drive mode selector switch 107, a speed sensor 106 and such are connected to the controller 105.

The collar 65 is fitted in the annular groove 52$a$ of the moving sleeve 52. When the output shaft 61 rotates, the collar 65 and the shifting pin 63 revolve about the axis $O_1$ of the output shaft 61 to shift the moving sleeve 52 axially.

Figure 4:
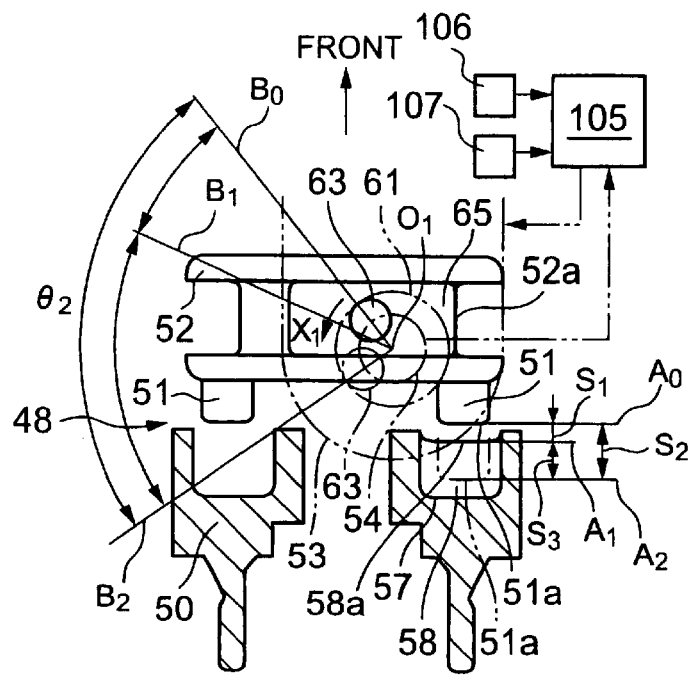
FIG. 4 is a schematic plan view of a dog clutch in a disengaged state for a two-wheel drive mode.

FIG. 4 shows the dog clutch 48 in a disengaged state for the two-wheel drive mode. The shifting pin 63 supported on the output shaft 61 of the electric motor 53 is located at a start position $B_0$, and the rear ends (free ends) 51$a$ of the teeth 51 of the moving sleeve 52 are spaced from the recesses 57 and are located at a disengaging position $A_0$.

Figure 5:
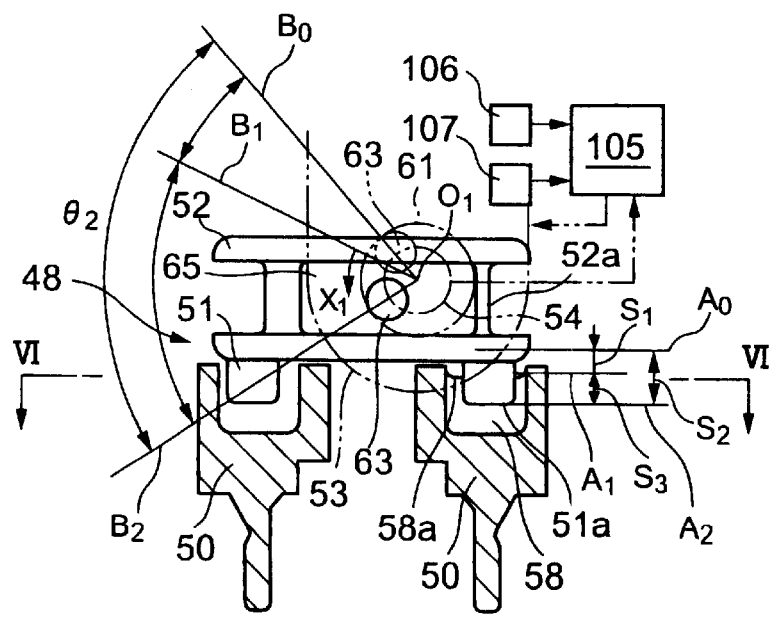
FIG. 5 is a schematic plan view of the dog clutch in an engaged state for a four-wheel drive mode.

FIG. 5 shows the dog clutch 48 in an engaged state for the four-wheel drive mode. The shifting pin 63 supported on the output shaft 61 has been turned from the start position $B_0$ through a predetermined angle $\theta_2$ in the direction of the arrow $X_1$ to an end position $B_2$ and, consequently, the projections 51 of the moving sleeve 52 are moved rearward from the disengaging position $A_0$ through a stroke $S_2$ to an engaging position $A_2$ and are engaged completely with the recesses 57. When the shifting pin 63 is turned to an angular position $B_1$ to shift the rear ends 51$a$ of the projections 51 to a contact position $A_1$, the rear ends 51$a$ come into contact with the front ends of the ribs 58 demarcating the recesses 57. A stroke $S_1$ between the disengaging position $A_0$ and the contact position $A_1$ is a preparatory stroke to make the dog clutch 48 start engaging, and a stroke $S_3$ between the contact position $A_1$ and the engaging position $A_2$ is an interlocking stroke to make the dog clutch 48 fully engage.

Voltages indicating the start position $B_0$ and the end position $B_2$ of the shifting pin 63 shown in FIG. 4 are stored in a storage device included in the controller 105. The electric motor 53 is actuated by operating the drive mode selector switch 107 to turn the shifting pin 63 from the start position $B_0$ to the end position $B_2$, whereby the projections 51 of the moving sleeve 52 are moved from the disengaging position $A_0$ to the engaging position $A_2$ to engage the dog clutch 48. The angular position and the angle of rotation of the output shaft 61 of the electric motor 53 are controlled on the basis of changes in voltage and current measured by the potentiometer 54 to locate the projections 51 of the moving sleeve 52 at the disengaging position $A_0$ or the engaging position $A_2$. Programs representing control procedures for controlling the selective four-wheel drive transmission system are stored in the storage device of the controller 105.

(1) Control Procedure for Repeating Dog Clutch Engaging Operation

In a state shown in FIG. 4, in which the dog clutch 48 is disengaged to set the selective four-wheel drive transmission system for the two-wheel drive mode, the drive mode selector switch 107 is operated to select the four-wheel drive mode. Then, the shifting pin 63 is turned in the direction of the arrow $X_1$ to shift the projections 51 of the moving sleeve 52 from the disengaging position $A_0$ to the engaging position $A_2$. When the projections 51 are shifted from the disengaging position $A_0$ to the engaging position $A_2$, the rear ends 51$a$ of the projections 51 strike against the front ends 58$a$ of the ribs 58 demarcating the recesses 57 of the coupling member 50. Sometimes, the projections 51 are unable to engage in the recesses 57 and the rear ends 51$a$ of the projections 51 remain pressed against the front ends 58$a$ of the ribs 58 for a time. In such a case, time which has elapsed since the rear ends 51$a$ came into contact with the front ends 58$a$ of the ribs 58 is measured, and the output shaft 61 of the electric motor 53 is returned to the start position $B_0$ to return the moving sleeve 52 to the disengaging position $A_0$ after the rear ends 51$a$ of the projections 51 have been kept in contact with the front ends 58$a$ of the ribs 58 for a predetermined time or after a locking current has flowed through the electric motor 53 continuously for a predetermined time, and then the moving sleeve 52 is moved toward the coupling member 50 to shift the rear ends 51$a$ of the projections 51 to the engaging position $A_2$ to engage the dog clutch 48.

(2) Control Procedure for Repressing Projections of Dog Clutch during Four-wheel Drive Mode If the potentiometer 54 detects a voltage change indicating the start of shift of the moving sleeve 52 from the engaging position $A_2$ toward the disengaging position $A_0$ in a state where the selective four-wheel drive transmission system is set for the four-wheel drive mode with the projections 51 of the moving sleeve 52 of the dog clutch 48 engaged in the recesses 57 of the coupling member 50 of the dog clutch 48 as shown in FIG. 5 for torque transmission, the electric motor 53 is driven to urge the shifting pin 63 again toward the end position $B_2$ so that the rear ends 51$a$ of the projections 51 of the moving sleeve 52 is moved to the engaging position $A_2$.

(3) Control Procedure for Change from Two-wheel Drive Mode to Four-wheel Drive Mode The output shaft 61 of the electric motor 53 turns in the direction of the arrow $X_1$ and the moving pin 63 provided with the collar 65 shifts the moving sleeve 52 rearward when the drive mode selector switch 107 is operated in the state shown in FIG. 4, where the dog clutch 48 is disengaged, to select the four-wheel drive mode. Power is supplied to the electric motor 53, for example, at a duty factor of 50% while the rear ends 51$a$ of the projections 51 are moving for the stroke $S_1$ from the disengaging position $A_0$ to the contact position $A_1$. Power is supplied to the electric motor 53, for example, at a duty factor of 80% to move the rear ends 51$a$ of the projections to the engaging position $A_2$ by increasing the pressure applied to the moving sleeve 52 after the potentiometer 54 has detected the start of engagement of the projections 51 in the recesses 57 through the detection of a change in the position of the rear ends 51$a$ of the projections 51 from the contact position $A_1$ toward the engaging position $A_2$.

(4) Other Control Procedures

In a state shown in FIG. 4, in which the dog clutch 48 is disengaged to set the selective four-wheel drive transmission system for the two-wheel drive mode, the drive mode selector switch 107 is operated to select the four wheel drive mode. If the traveling speed of all-terran vehicle sensed by the vehicle speed sensor 106 is less than 1 km/h, the changing operation from the two-wheel drive mode to the four-wheel drive mode is not adequate and the electric motor 53 is stopped and the above changing operation is controlled not to be executed. If the traveling speed of all-terran vehicle sensed by the vehicle speed sensor 106 is more than 20 km/h, the changing operation is also controlled not to be executed.

Explanation for Control Method in a Flow Chart

Figure 7:
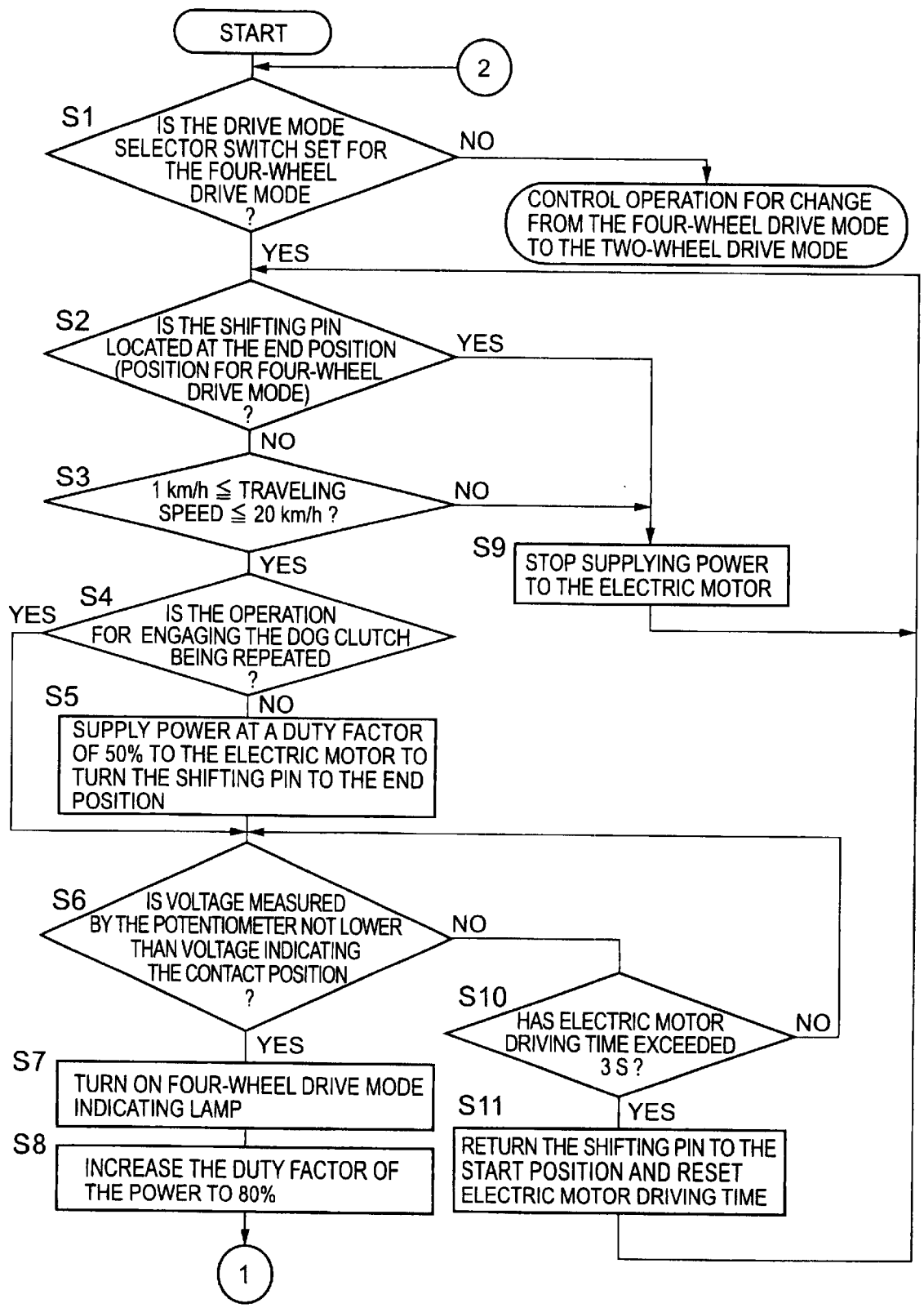
FIG. 7 is a flow chart of a control procedure for changing a selective four-wheel drive transmission system from the two-wheel drive mode to the four-wheel drive mode.

Referring to FIG. 7 showing a flow chart of a control procedure for changing the selective four-wheel drive transmission system from the two-wheel drive mode to the four-wheel drive mode, a query is made in step S1 to see if the drive mode selector switch is set for the four-wheel drive mode. If the response in step S1 is negative, i.e., if the four-wheel drive mode is not selected, a control procedure for changing the selective four-wheel drive transmission system from the four-wheel drive to the two-wheel drive is executed. If the response in step S1 s affirmative, i.e., if the four-wheel drive mode is selected, a query is made in step S2 to see if the shifting pin 63 attached to the output shaft 61 of the electric motor 53 is at the end position (position for the four-wheel drive mode) $B_2$. If the selective four-wheel drive transmission system is set for the four-wheel drive mode, the response instep S2 is affirmative, and then power supply to the electric motor 53 is stopped (step 9). If the response in step S2 is negative the control procedure advances to step S3.

A query is made in step S3 to see if the traveling speed of the all-terrain vehicle is in the range of 1 to 20 km/h. Step S9 is executed to stop power supply to the electric motor 53 if the response instep S3 is negative. Step S4 is executed if the response in step S3 is affirmative. A query is made in step S4 to see if the operation for engaging the dog clutch is repeated. If the response in step S4 is negative, step S5 is executed to supply power to the electric motor 53 at a duty factor of 50% to turn the shifting pin 63 to the end position $B_2$ side, and then step S6 is executed. If the response in step S4 is affirmative, it is decided that the electric motor 53 is in operation and step S6 is executed.

A query is made in step S6 to see if a voltage measured by the potentiometer 54 indicates the start of engagement of the projections 51 in the recess 57, i.e., to see if a voltage measured by the potentiometer 54 is not lower than a voltage indicating the contact position $A_1$. If the response in step S6 is affirmative, the four-wheel drive mode indicating lamp is turned on in step S7, and the duty factor of the power supplied to the electric motor 53 is increased to 80% in step S8. If the response in step S6 is negative, a query is made in step S10 to see if electric motor driving time has exceeded 3 s. If the response instep S1 is negative, i.e., if the electric motor driving time is less than 3 s, step S6 is executed again. If the response in step S10 is affirmative, it is decided that the projections 51 are in meeting with the ribs 58 demarcating the recesses 57, the shifting pin 63 supported on the output shaft 61 is returned to the start position $B_0$ and the electric motor driving time is reset in step S11, and then the control procedure returns to step S1 to repeat the dog clutch engaging operation. Although this control procedure decides in step S10 whether or not the shifting pin 63 is to be returned to the start position $B_0$ in step S11 to repeat the dog clutch engaging operation on the basis of the electric motor driving time, such a decision may be made in step S10 on the basis of the duration of a locking current flowing through the electric motor 53; that is, the step S11 may be executed if the duration of the looking current exceeds a predetermined time.

Figure 8:
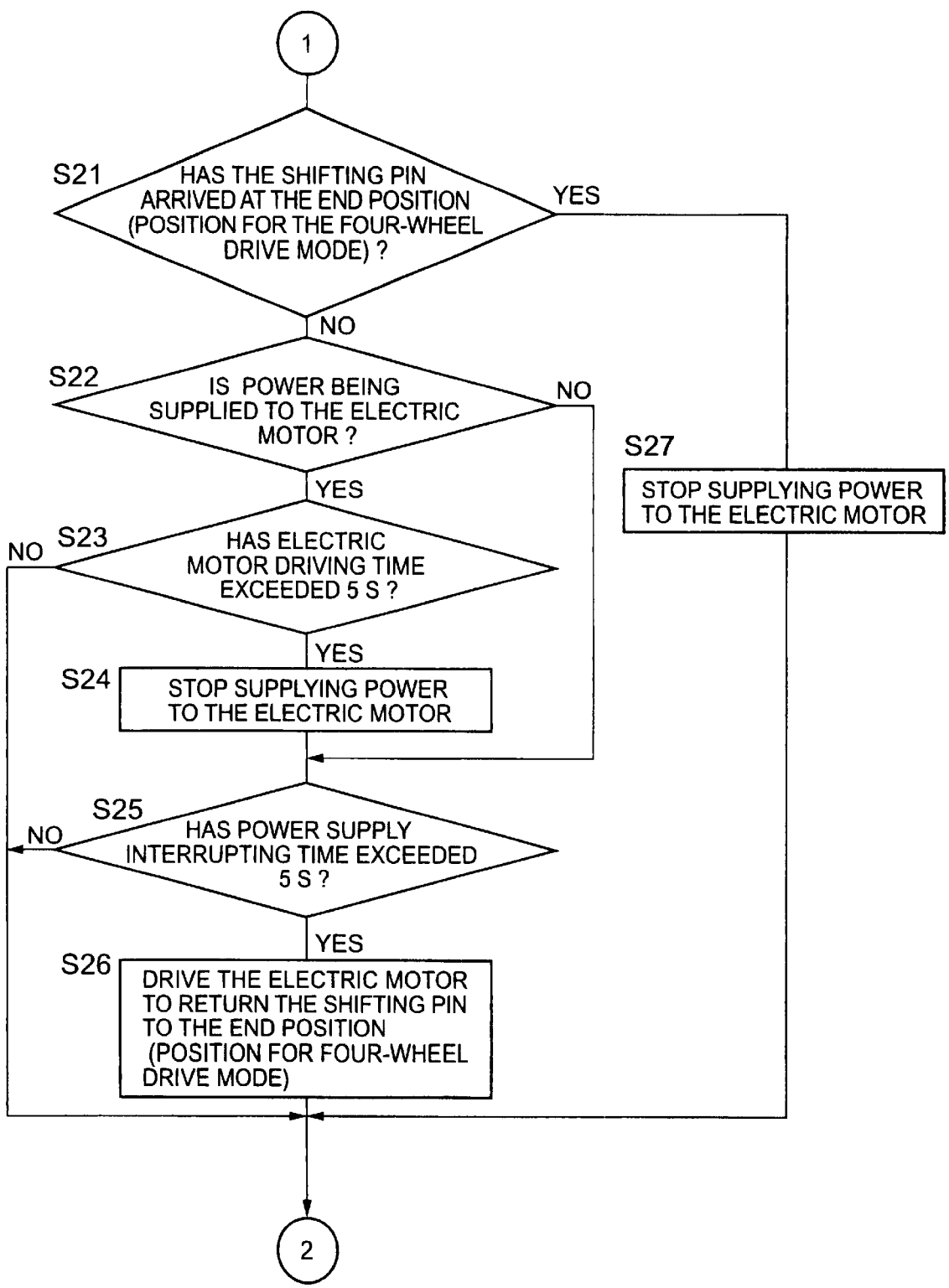
FIG. 8 is a flow chart of a continuation of the flow chart shown in FIG. 7.

After the dog clutch 48 has been engaged and the duty factor of the power supplied to the electric motor 53 has been increased to 80% in step S8, the control procedure goes through a point of exit represented by a symbol ① to step S21 of a control procedure shown in FIG. 8. A voltage measured by the potentiometer 54 is examined in step S21 to see if the shifting pin 63 supported on the output shaft 61 of the electric motor 53 has arrived at the end position $B_2$. If the response in step S21 is affirmative, it is decided that the selective four-wheel drive transmission system has been set for the four-wheel drive mode, and power supply to the electric motor 53 is stopped in step S27. If the response in step S21 is negative, a query is made in step S22 to see if power is being supplied to the electric motor 53. If the response in step S22 is affirmative, a query is made in step S23 to see if electric motor driving time has exceeded 5 s. If the response in step S23 is affirmative, power supply to the electric motor 53 is stopped in step S24 and the control procedure goes to step S25. If the response in step S22 is negative, i.e., if power supply to the electric motor 53 has been already stopped, the control procedure goes directly to step S25. A query is made instep S25 to see if power supply interrupting time has exceeded 5 s. If the response in step S25 is affirmative, the electric motor 53 is driven to move the shifting pin 63 supported on the output shaft 61 of the electric motor 53 to the end position $B_2$. If the response in step S23 or step S25 is negative and after the completion of the step S27 or S26, the program returns through a point of exit represented by a symbol ② to step S1 of the control procedure shown in FIG. 7.

Figure 9:
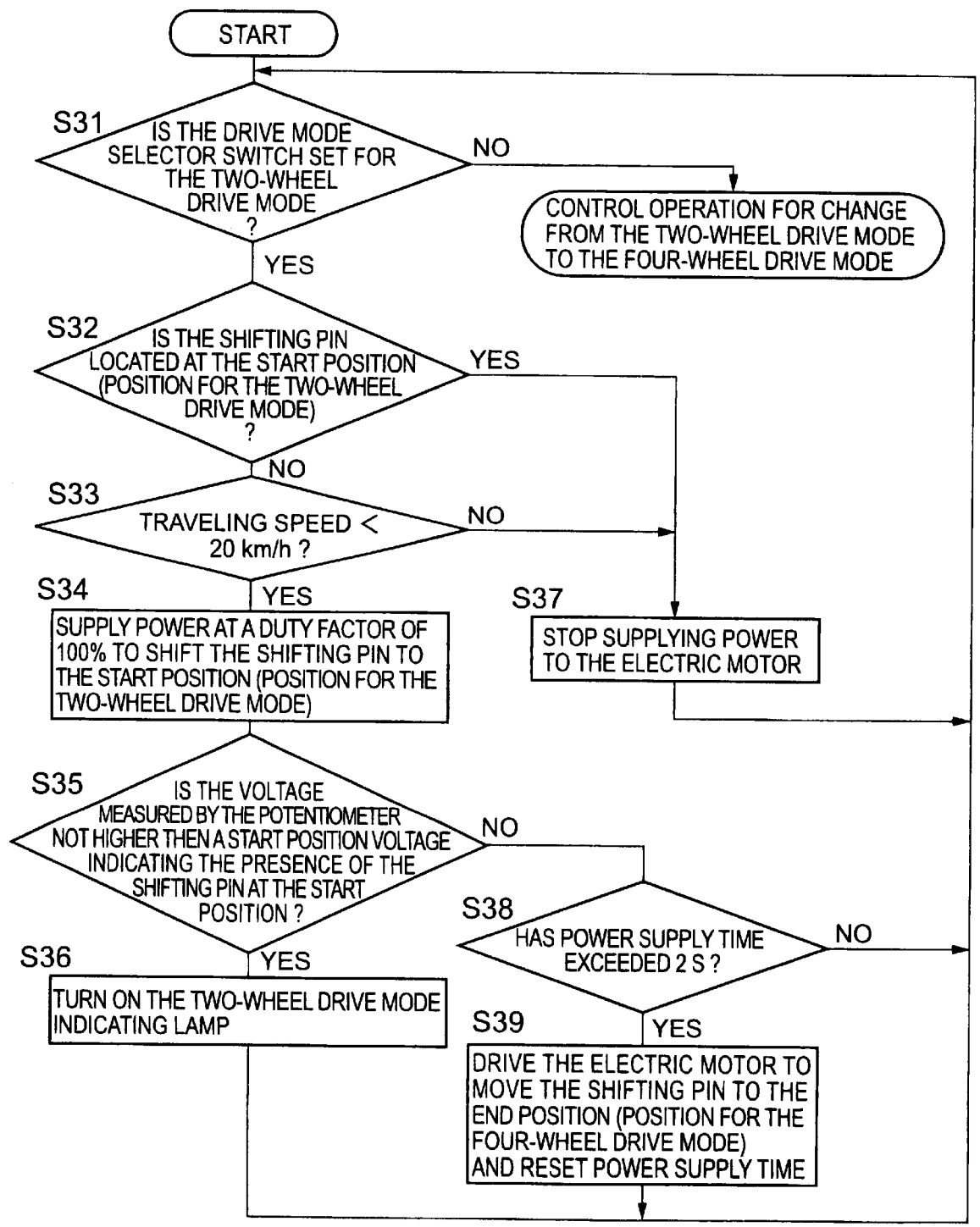
FIG. 9 is a flow chart of a control procedure for changing the selective four-wheel drive transmission system from the four-wheel drive mode to the two-wheel drive mode.

Referring to FIG. 9 showing a flow chart of a control procedure for changing the selective four-wheel drive transmission system from the four-wheel drive mode to the two-wheel drive mode, a query is made in step S31 to see if the drive mode selector switch is set for the two-wheel drive mode. If the response in step S31 is affirmative, a query is made in step S32 to see if the shifting pin 63 supported on the output shaft 61 of the electric motor 53 is located at the start position (two-wheel drive mode selecting position) $B_0$. Power supply to the electric motor is stopped in step S37 if the response in step S32 is affirmative or the control procedure goes to step S33 if the response in step S32 is negative.

A query is made in step S33 to see if the traveling speed of the all-terrain vehicle is not higher than 20 km/h. Power supply to the electric motor 53 is stopped in step S37 if the response in step S33 is negative or power is supplied at a duty factor of 100% to the electric motor 53 to return the shifting pin 63 to the start position $B_0$ and the control procedure goes to step S35 if the response in step S33 is affirmative. In step S35, a voltage measured by the potentiometer 54 is compared with a start point voltage indicating the presence of the shifting pin 63 at the start point $B_0$ to see if the voltage measured by the potentiometer 54 is not higher than the start point voltage. If the response in S35 is affirmative, i.e., if the voltage measured by the potentiometer is not higher than the start point voltage, the two-wheel drive mode indicating lamp is turned on in step S36. If the response in step S35 is negative, i.e., if the shifting pin 63 has not yet been returned to the start position $B_0$, a query is made in step S38 to see if electric motor driving time has exceeded 2 s. If the response in step S38 is negative, i.e., if electric motor driving time is less than 2 s, the control procedure returns to step S31. If the response in step S38 is affirmative, i.e., if electric motor driving time equal to or longer than 2 s, the electric motor 53 is driven to move the shifting pin 63 to the end position (four-wheel drive mode selecting position) $B_2$ and electric motor driving time is reset in step S39 and the control procedure returns to step S31.

Figure 10:
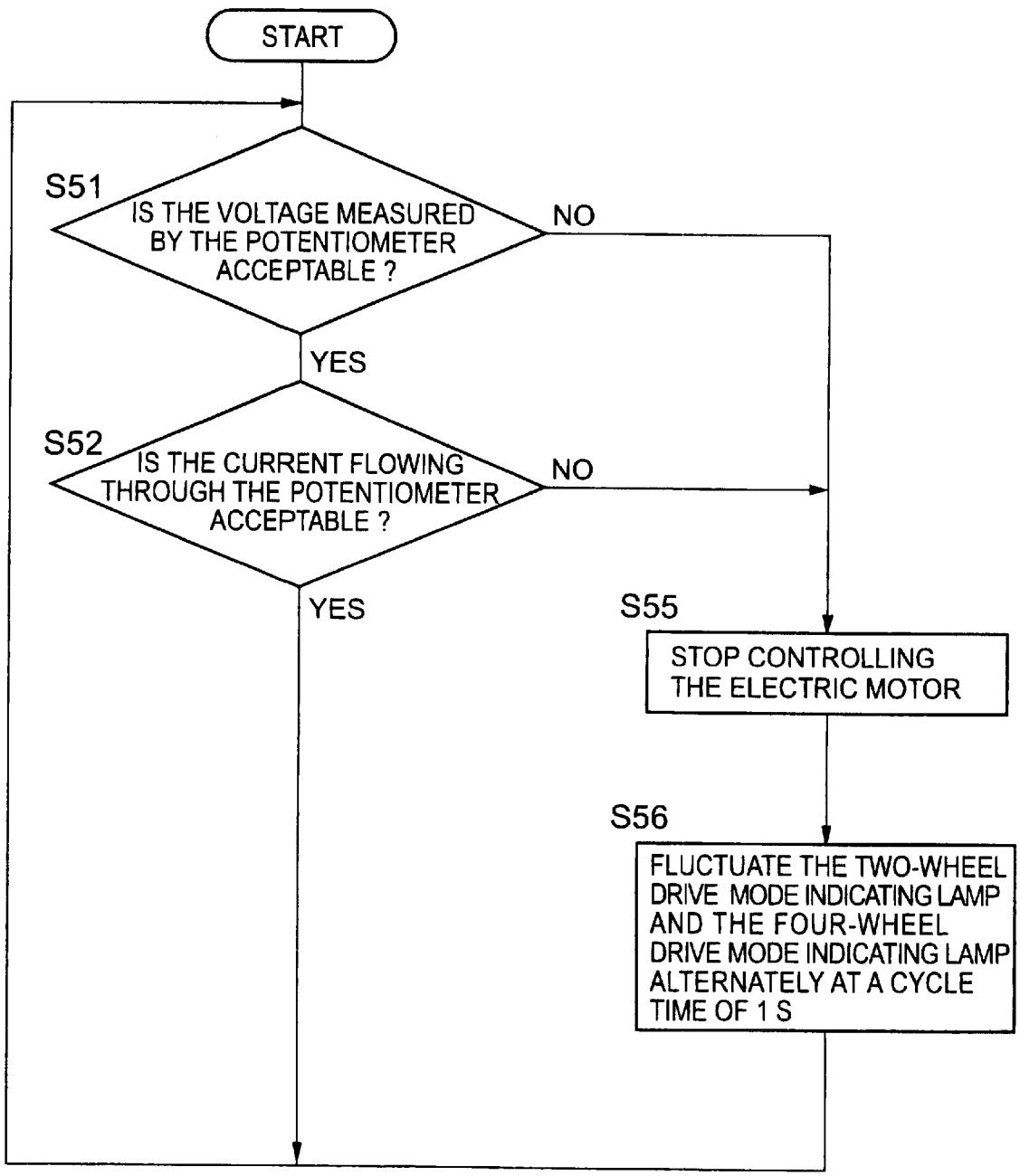
FIG. 10 is a flow chart of a fail-safe control procedure.

FIG. 10 is a flowchart of a fail-safe control procedure for the fail-safe control of the dog clutch 48. A query is made in step S51 to see if a voltage measured by the potentiometer 54 is acceptable, i.e., if a voltage measured by the potentiometer 54 is in a normal voltage range. If the response in step S51 is affirmative, a query is made in step S52 to see if a current flowing through the potentiometer 54 is in a normal current range. If the response in step S52 is affirmative the control procedure returns to step S51.

If the response in step S51 or step S52 is negative, i.e., if the voltage or the current is abnormal, the control of the electric motor 53 is stopped in step S55 and the control program goes to step S56.

The two-wheel drive mode indicating lamp and the four-wheel drive mode indicating lamp are flickered alternately at a cycle time of 1 s to warn the rider of the electric motor 53 being in an abnormal state. After making the two-wheel drive mode indicating lamp and the four-wheel drive mode indicating lamp flicker alternately for warning in step S56, the control procedure returns to step S51.

The dog clutch 48 for connecting the front reduction gear to the drive shaft 17 may be placed at any position on the front wheel driving power transmitting line between the drive shaft 17 and the front axles, such as a position between the drive shaft 17 and the front propeller shaft 18 or a position in a part of the front propeller shaft 18. A dog clutch for connecting the rear reduction gear to the drive shaft 17 may be placed at any position on the rear wheel driving power transmitting line between the drive shaft 17 and the rear axles.

The electric actuator is not limited to the electric motor, i.e., a rotary actuator, but may be a linear electric actuator.

The shifting member provided with projections and driven fro axial movement by the electric motor is not limited to the shifting sleeve as shown in FIG. 3, but may be a shifting arm.

Although the invention has been described in its preferred embodiment with a certain degree of particularity, obviously many changes and variations are possible therein. Therefore it is to be understood that the present invention may be practiced otherwise than as specifically described herein without departing from the scope and spirit thereof.

What is claimed is:

1. A method of controlling a selective four-wheel drive transmission system for an all-terrain vehicle, said selective four-wheel drive transmission system including a front transmission system for transmitting driving power to front wheels, a rear transmission system for transmitting driving power to rear wheels, a dog clutch including a stationary member provided with teeth and a moving member provided with teeth, and included in either the front transmission system or the rear transmission system so as to be engaged or disengaged to set the selective four-wheel drive transmission system selectively for a four-wheel drive mode or a two-wheel drive mode, an electric actuator for moving the moving member of the dog clutch between an engaging position and a disengaging position, a position sensor incorporated into the electric actuator and capable of determining a position where the moving member is situated, and a controller for controlling the electric actuator, said method comprising the steps of:

determining a position of the moving member of the dog clutch by the position sensor;

sending a position signal representing the position of the moving member of the dog clutch and provided by the position sensor to the controller; and controlling the position of the moving member of the dog clutch on the basis of the position signal by the controller.

2. The method of controlling a selective four-wheel drive transmission system for an all-terrain vehicle according to claim 1, wherein, the electric actuator is controlled such that the moving member of the dog clutch is returned temporarily to the disengaging position and is moved again toward the engaging position when the dog clutch cannot be properly engaged when changing the selective four-wheel drive transmission system from the two-wheel drive mode to the four-wheel drive mode.

3. The method of controlling a selective four-wheel drive transmission system for an all-terrain vehicle according to claim 1, wherein the electric actuator is controlled so as to force the moving member of the dog clutch to the engaging position when a position sensor detects movement of the moving member toward the disengaging position by a distance exceeding a predetermined distance in a state where the selective four-wheel drive transmission system is set for the four-wheel drive mode.

4. The method of controlling a selective four-wheel drive transmission system for an all-terrain vehicle according to claim 1, wherein the electric actuator is controlled by a duty factor control system, and the duty factor of power supplied to the electric actuator during movement of the moving member of the dog clutch from a start position to a contact position is smaller than that of power supplied during movement of the moving member of the dog clutch from the contact position to a engaging position.

* * * * *